United States Patent
Lancry et al.

(10) Patent No.: US 12,509,898 B2
(45) Date of Patent: Dec. 30, 2025

(54) BATTERY POWERED AUTOMATIC SWIMMING POOL CLEANERS AND ASSOCIATED COMPONENTS

(71) Applicant: ZODIAC POOL CARE EUROPE, Belberaud (FR)

(72) Inventors: Arnaud Lancry, Beaupuy (FR); Louis Favie, Colomiers (FR); Remi Deloche, Toulouse (FR)

(73) Assignee: ZODIAC POOL CARE EUROPE, Belberaud (FR)

( * ) Notice: Subject to any disclaimer, the term of this patent is extended or adjusted under 35 U.S.C. 154(b) by 0 days.

(21) Appl. No.: 17/573,855

(22) Filed: Jan. 12, 2022

(65) Prior Publication Data

US 2022/0220761 A1    Jul. 14, 2022

Related U.S. Application Data

(60) Provisional application No. 63/137,386, filed on Jan. 14, 2021.

(51) Int. Cl.
*E04H 4/16*    (2006.01)

(52) U.S. Cl.
CPC .................. *E04H 4/1654* (2013.01)

(58) Field of Classification Search
CPC ..... E04H 4/16; E04H 4/1654; A47L 11/4005; A47L 11/4002; A47L 2201/00
USPC ......................................................... 15/1.7
See application file for complete search history.

(56) References Cited

U.S. PATENT DOCUMENTS

| | | | |
|---|---|---|---|
| 10,294,686 B1 * | 5/2019 | Erlich | E04H 4/1654 |
| 10,487,525 B1 * | 11/2019 | Stearns | E04H 4/1636 |
| 2004/0025268 A1 | 2/2004 | Porat et al. | |
| 2007/0067930 A1 | 3/2007 | Garti | |

(Continued)

FOREIGN PATENT DOCUMENTS

| | | |
|---|---|---|
| EP | 3279409 A1 | 2/2018 |
| EP | 3293324 A1 | 3/2018 |
| EP | 3633120 A1 | 4/2020 |

OTHER PUBLICATIONS

International Application No. PCT/IB2022/050214, International Search Report and Written Opinion mailed on Mar. 31, 2022, 14 pages.

(Continued)

*Primary Examiner* — Shay Karls
(74) *Attorney, Agent, or Firm* — Kilpatrick Townsend & Stockton LLP

(57) ABSTRACT

An automatic swimming pool cleaner may include a modular battery block attachable to a component of the automatic swimming pool cleaner. The modular battery block may include at least one battery or other source of electrical power that is accessible from externally of the chassis. A venting system or arrangement may be included for venting the modular battery block, such as venting gas produced by at least one battery. Supplying electrical power to an automatic swimming pool cleaner having a chassis and an motor may include (i) attaching a modular battery block to the chassis so as to form an integrated device, and (ii) causing an electrical connection within the integrated device between the motor and at least one battery of the modular battery block.

12 Claims, 11 Drawing Sheets

(56) References Cited

U.S. PATENT DOCUMENTS

| | | | |
|---|---|---|---|
| 2014/0154535 A1* | 6/2014 | Olsson | H01M 10/613 |
| | | | 429/53 |
| 2014/0263087 A1 | 9/2014 | Renaud et al. | |
| 2017/0051467 A1 | 2/2017 | Casadio et al. | |
| 2018/0066444 A1* | 3/2018 | van der Meijden | E04H 4/1654 |
| 2020/0056391 A1 | 2/2020 | Lancry | |

OTHER PUBLICATIONS

International Application No. PCT/IB2022/050214, International Preliminary Report on Patentability mailed on Jul. 27, 2023, 10 pages.
European Application No. 22700251.6, Office Action mailed on Jul. 21, 2025, 6 pages.

* cited by examiner

BATTERY POWERED AUTOMATIC SWIMMING POOL CLEANERS AND ASSOCIATED COMPONENTS

REFERENCE TO RELATED APPLICATION

This application claims the benefit of U.S. Provisional Patent Application No. 63/137,386, filed on Jan. 14, 2021 and entitled BATTERY POWERED AUTOMATIC SWIMMING POOL CLEANERS AND ASSOCIATED COMPONENTS, the content of which is hereby incorporated by reference in its entirety.

FIELD OF THE INVENTION

This application relates to cleaning devices for water-containing vessels such as swimming pools and spas and more particularly, although not necessarily exclusively, to constructions and components of autonomous swimming pool cleaners powered by batteries.

BACKGROUND

Automatic swimming pool cleaners (APCs) are well known. These cleaners often are categorized as either "hydraulic" or "robotic" (or "electric"), depending on the source of their motive power. Hydraulic cleaners, for example, typically use pressurized (or depressurized) water to effect their autonomous movement within pools, whereas robotic cleaners typically utilize an electric motor to cause their movement. Moreover, hydraulic cleaners frequently are subcategorized as either "pressure-side" or "suction-side" devices, with pressure-side cleaners receiving pressurized water output from an associated water-circulation pump and suction-side cleaners, by contrast, being connected to an inlet of the pump.

Some APCs may use a battery as a source of power; however, traditionally, such batteries are housed within the body of the APC. For example, one of numerous types of APCs is described in commonly-owned U.S. Patent Application Publication No. 2020/0056391 of Lancry. Disclosed in the Lancry application is an "electric" cleaner as well as a docking station or base. The cleaner may be cordless, containing instead within its body "one or more on-board batteries for electrical power." See Lancry, p. 1, ¶ 0011. As noted in the Lancry application, the battery advantageously is rechargeable when the cleaner is docked at the base. See id., p. 3, ¶ 0038.

U.S. Patent Application Publication No. 2007/0067930 to Garti illustrates another type of robotic cleaner. Tethered to the body of the cleaner is a head designed to float within a swimming pool, while contained within the body is a rechargeable battery pack. See Garti, p. 2, ¶ 0026; p. 1, ¶ 0023. Charging of the batteries occurs using an external charging cable attachable between the body and the head. See id., p. 3, ¶ 0034.

Yet another battery-powered electric cleaner is described in U.S. Patent Application Publication No. 2014/0263087 of Renaud, et al. According to the Renaud application, a rechargeable battery may be included "within" or "outside of" a housing of the cleaner. See Renaud, pp. 2-3, ¶ 0025. An electric cable positioned between a docking station and a power source facilitates recharging the battery when the cleaner is connected to the docking station. See id., p. 3, ¶ 0028.

SUMMARY

Embodiments covered by this patent are defined by the claims below, not this summary. This summary is a high-level overview of various embodiments and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

According to some embodiments, a modular battery block is configured for attachment to a component of an automatic swimming pool cleaner.

According to various embodiments, an automatic swimming pool cleaner (i) comprises a chassis and (ii) is powered by at least one battery attached to the chassis and accessible from externally of the chassis.

According to certain embodiments, an automatic swimming pool cleaner includes (i) at least one battery and (ii) an arrangement for venting gas produced by the at least one battery.

According to various embodiments, a method of supplying electrical power to an automatic swimming pool cleaner having a chassis and a motor includes (i) attaching a modular battery block to the chassis so as to form an integrated device, and (ii) causing an electrical connection within the integrated device between the motor and at least one battery of the modular battery block.

According to some embodiments, an automatic swimming pool cleaner includes a chassis defining an interior cavity, and a modular battery block connected to the chassis and at least partially external to the interior cavity, the modular battery block comprising at least one source of electrical power.

Various implementations described herein may include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The specification makes reference to the following appended figures, in which use of like reference numerals in different figures is intended to illustrate like or analogous components.

DETAILED DESCRIPTION

The subject matter of embodiments is described herein with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "up," "down," "top," "bottom," "left," "right," "front," and "back," among others, are intended to refer to the orientation as illustrated and described in the figure (or figures) to which the components and directions are referencing; however, such direction references or identifies should not be considered limiting.

Disclosed herein are modular battery blocks configured to attach primarily to exteriors of cleaner bodies. In certain embodiments, the battery blocks provided herein are attachable to a chassis of an APC. Additionally, disclosed herein are modular battery blocks with an electronic management system for the batteries. Also disclosed herein are venting systems for the battery blocks.

Figure 1:
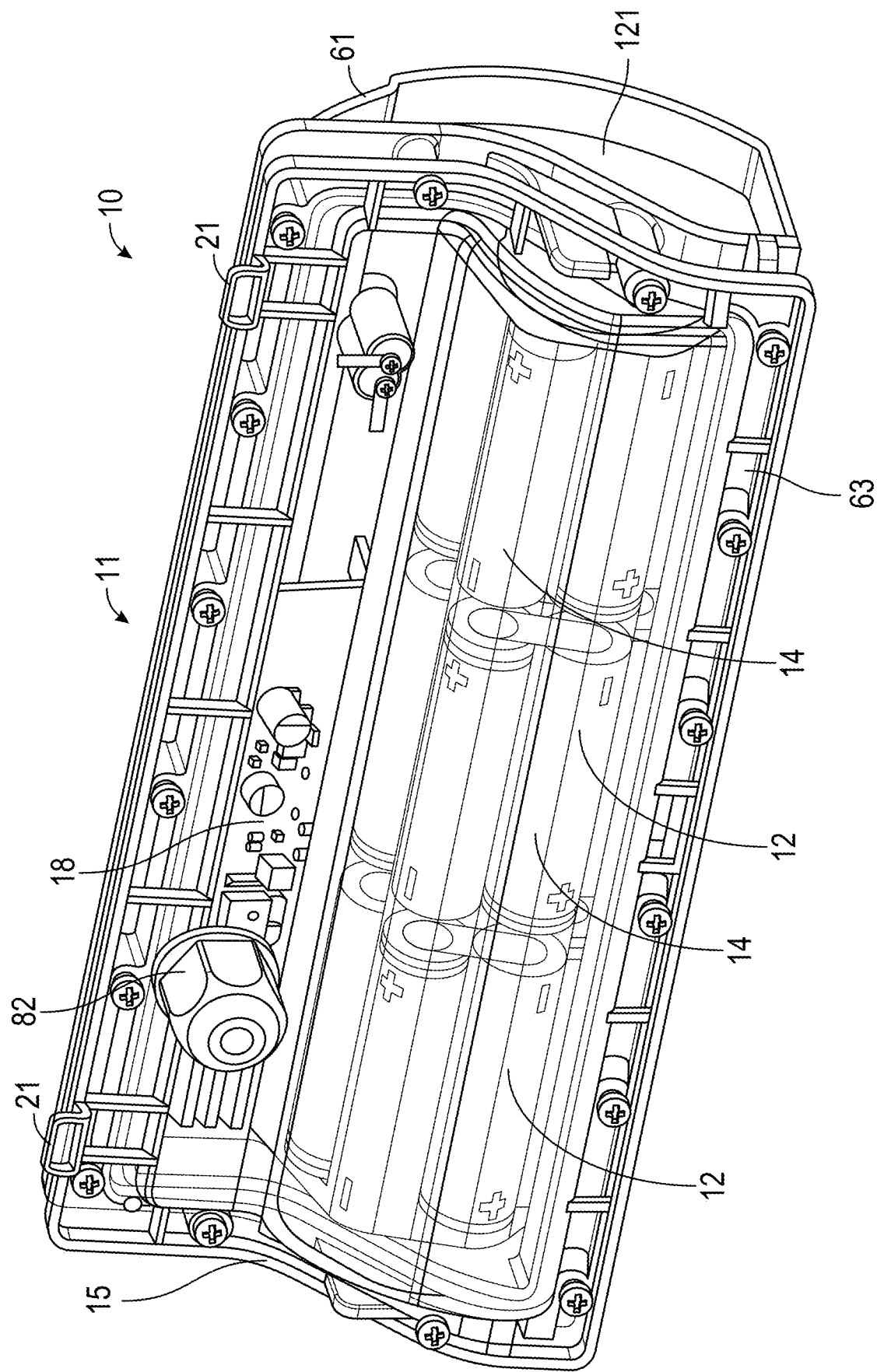
FIG. 1 illustrates a battery block for an APC according to embodiments.
Figure 2:
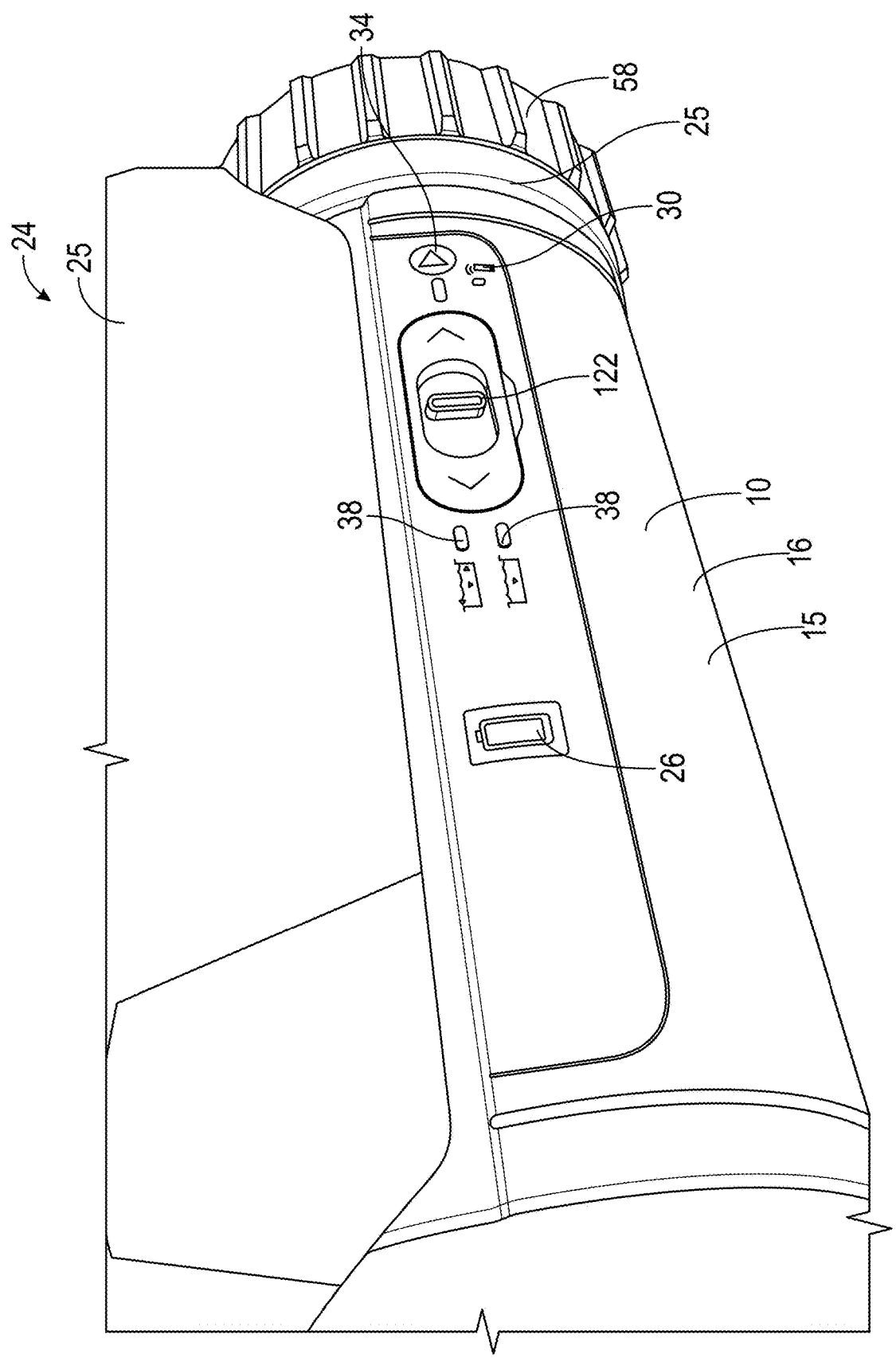
FIG. 2 illustrates the battery block of FIG. 1 installed on an APC according to embodiments.

FIG. 1 illustrates an exemplary modular battery block 10. In certain embodiments, battery block 10 generally includes a housing 15 having a first wall 61 and a second wall 63 opposite from the first wall 61. Sides 121 may optionally extend between the first wall 61 and the second wall 63. In certain embodiments, the first wall 61 may form an outer surface 16 of an APC when the battery block 10 is assembled with the APC. In some embodiments, and as illustrated in FIG. 2, the outer surface 16 optionally includes a non-linear curvature and/or various curvatures as desired. The first wall 61 and the second wall 63 together define a housing cavity, and various components of the battery block 10 may be provided within the housing cavity. In some embodiments, the first wall 61 and the second wall 63 are secured such that the housing cavity is waterproof and/or otherwise minimizes or prevents water from entering the housing cavity. In the embodiment illustrated, one or more stores of electricity 12 and a controller 18 are housed within the housing cavity.

As mentioned, the housing 15 may house one or stores of electricity 12 as desired, and in the embodiment illustrated, the one or more stores of electricity 12 are one or more batteries 14. The particular batteries 14 illustrated and the arrangement of the batteries 14 should not be considered limiting.

In addition to the stores of electricity 12, the battery block 10 optionally includes part or all of an electronic battery management system 11. In some embodiments, the battery management system 11 includes the controller 18, which may be various devices or mechanisms including but not limited to a printed circuit board (PCB) or card. In general, because the battery block 10 is intended for use within a water-containing vessel such as a swimming pool or spa, part or all of the battery block 10 advantageously is sealed so as to isolate the stores of electricity 12 (e.g., the batteries 14) and at least a portion of the battery management system 11 (e.g., the controller 18) from contact with the water.

In some optional embodiments, and as illustrated in FIG. 2, the battery block 10 includes a powering or "start" button or switch 122 as part of battery block 10. When included, the switch 122 may reduce the risk of having a non-start cycle or operation, and/or the switch 122 may improve safety of the APC 24 and/or the battery block 10.

Optionally, and as illustrated in FIG. 2 for example, the battery block 10 may include visual and/or other indicators of characteristics of the stores of electricity 12 and/or of an APC 24 as desired. The visual indicators may be various types of visual indicators as desired. Optionally where a plurality of visual indicators are included, at least one characteristic (e.g., color, pattern, intensity, etc.) of one visual indicator may be different from a characteristic of another visual indicator, although it need not be in other embodiments. In some non-limiting examples, one or more visual indicators may be light emitting diodes (LEDs), although in other embodiments they need not be LEDs. In the embodiment illustrated in FIG. 2, the battery block 10 includes four visual indicators 26, 30, 34, and 38. In this optional embodiment, the visual indicator 26 is a charging indicator providing an indication of battery charging status, the visual indicator 30 is a communication indicator providing an indication of whether the APC 24 is electronically connected to any other device for purposes of sending or receiving data or information, the visual indicator 34 is a power indicator that may indicate whether the APC 24 is, or is not, being powered by the batteries 14 or other store of electricity 12, and the visual indicator 38 is an operational mode indicator which may indicate whether the APC 24 is configured primarily for floor travel along a pool bottom or instead for both floor travel and wall climbing. Persons skilled in the relevant art will understand that these indicators are optional and, if present, visual indicators need not be identical to those depicted in FIG. 2.

Figure 3A:
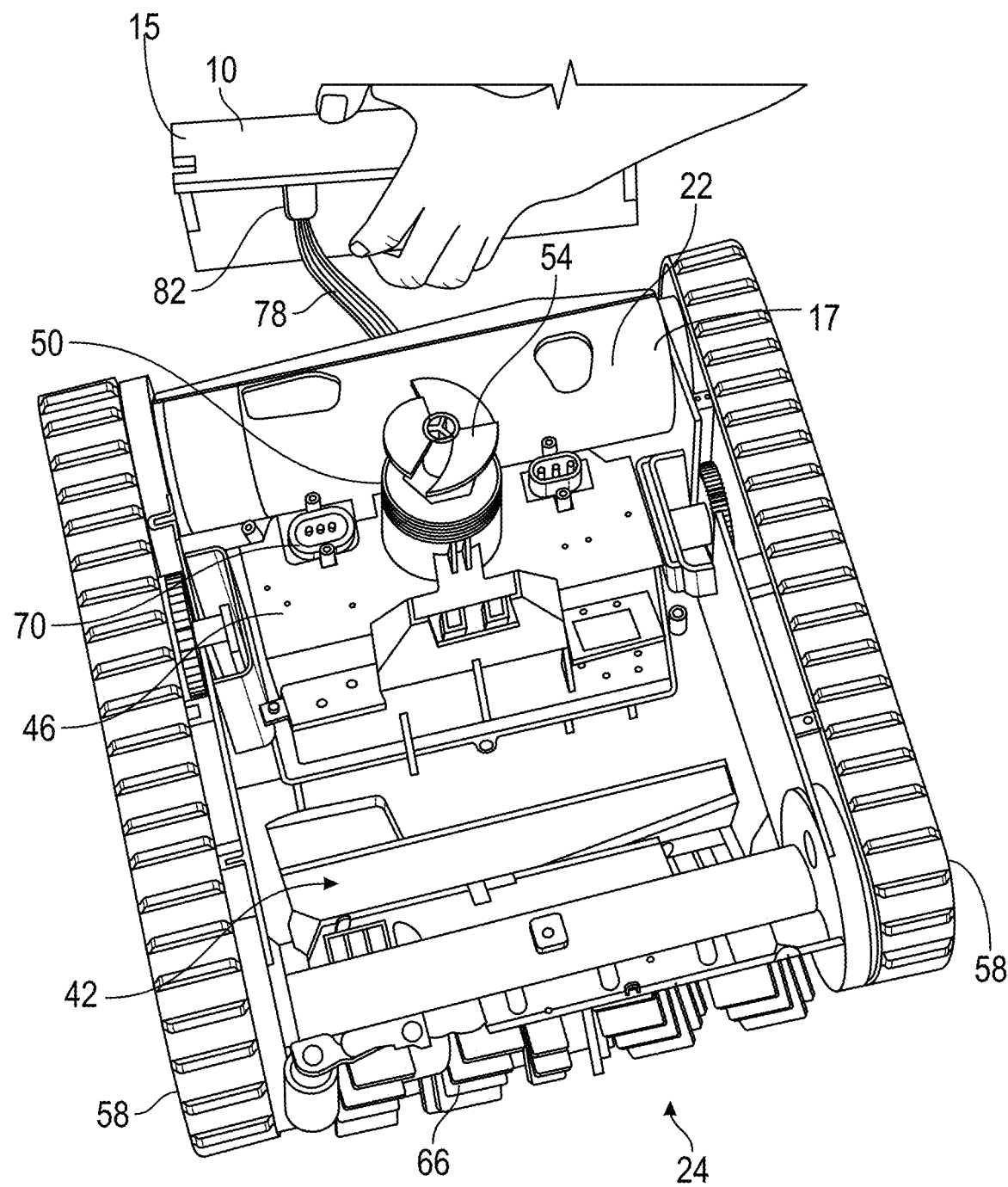
FIGS. 3A-D illustrate steps for connecting the battery block of FIG. 1 with the APC according to embodiments.
Figure 3B:
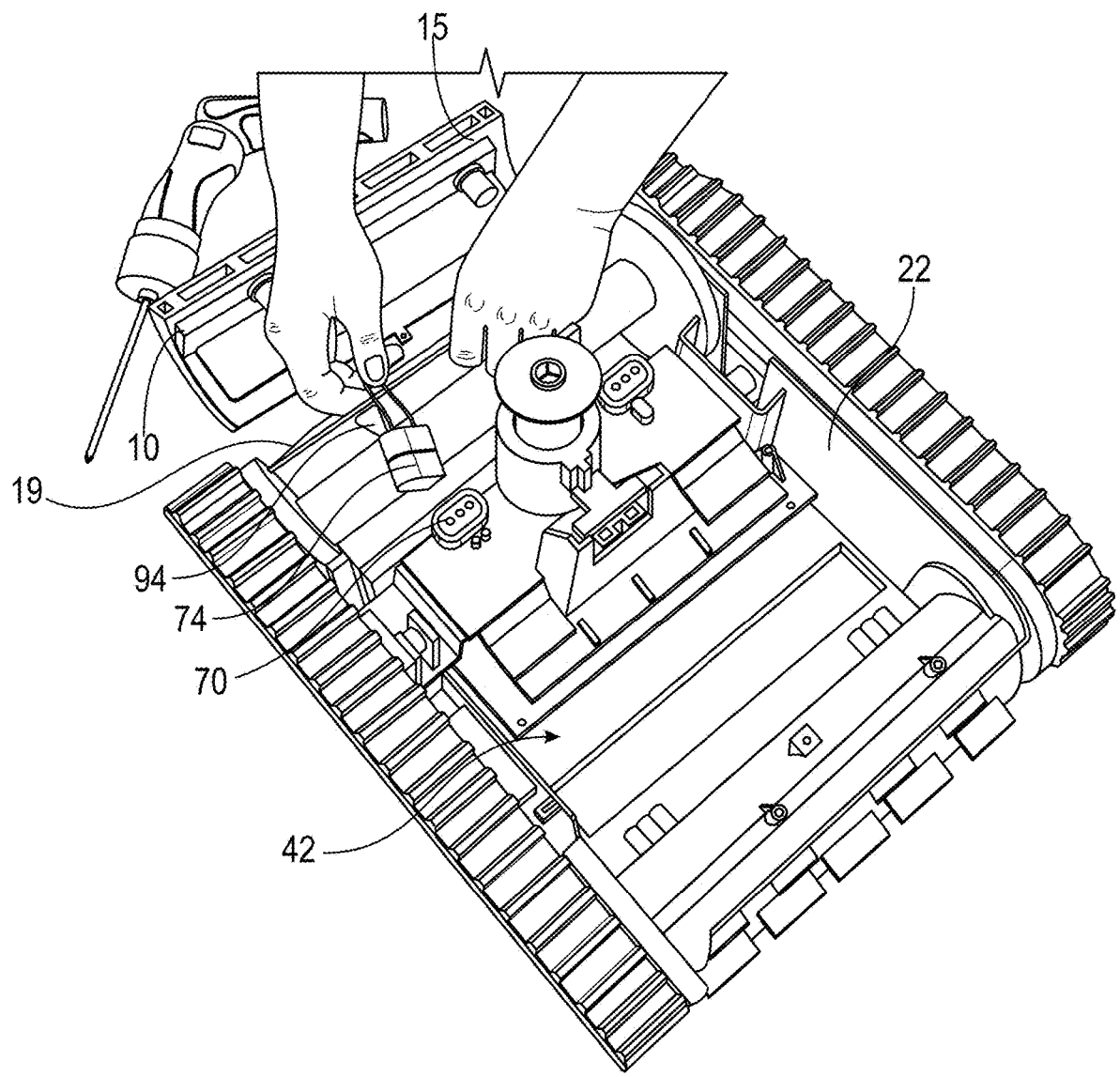
Figure 3C:
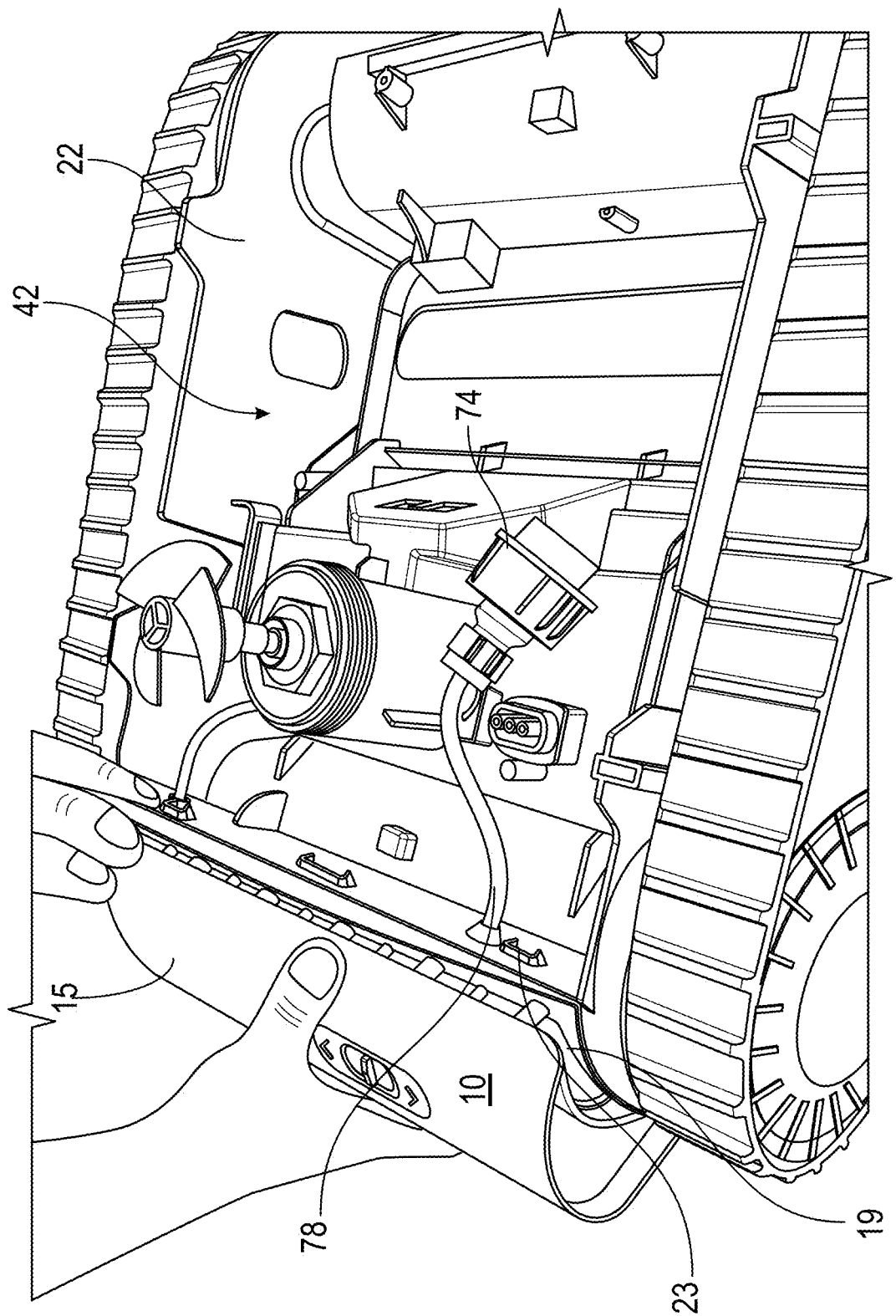
Figure 3D:
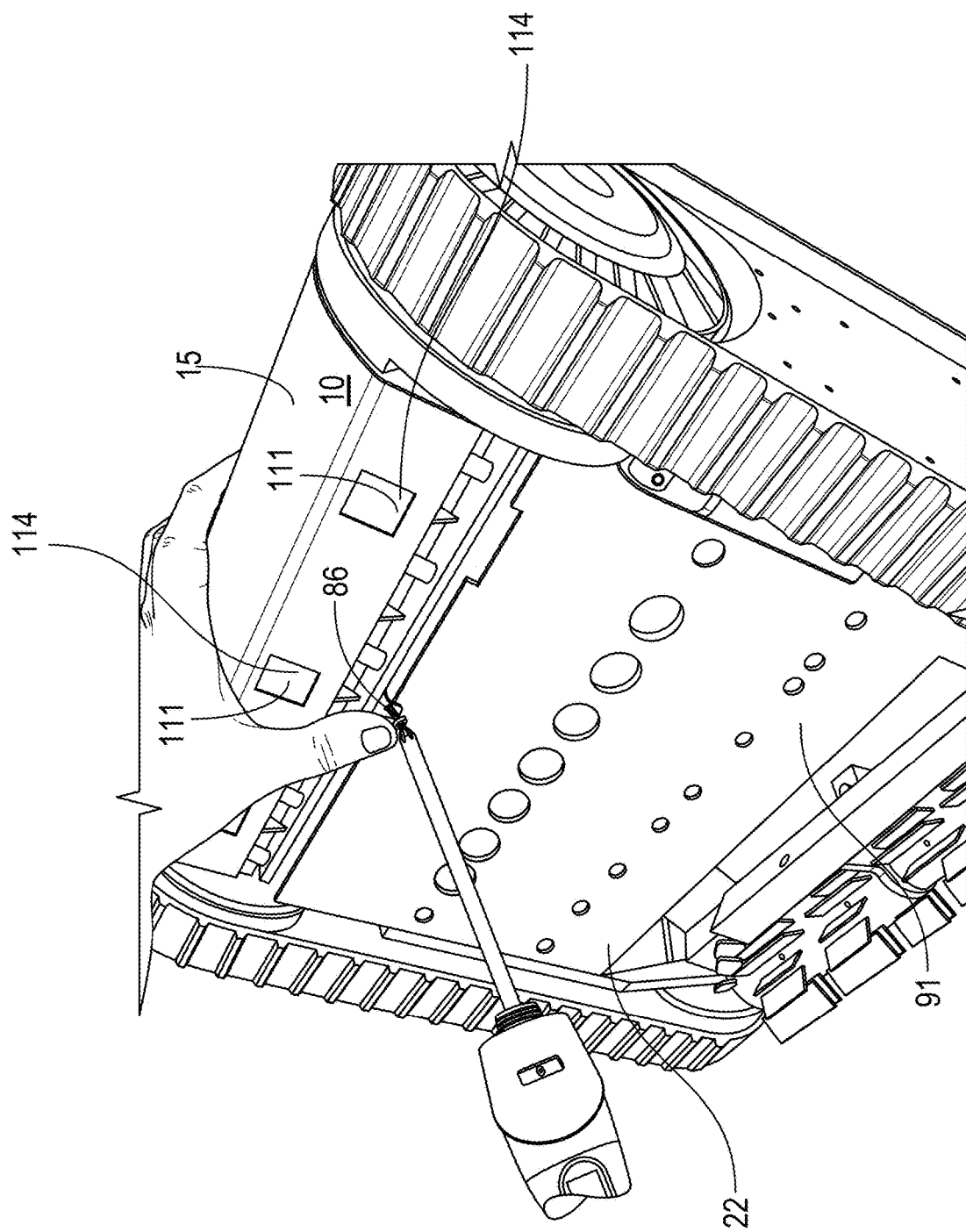

Optionally, and as best illustrated in FIG. 3D, the battery block 10 may include one or more electrically conductive portions 111 that may be used to charge and/or recharge the stores of electricity 12 as desired. In the embodiment illustrated, the electrically conductive portions 111 are conductive pads 114 that may be used to selectively engage conductive elements of a charging system. The location, number, and type of the conductive portions 111 should not be considered limiting, and in other embodiments they may be omitted as desired.

FIG. 2 shows the battery block 10 attached to an APC 24 having a chassis 22 and a housing 25. In FIG. 2, the battery block 10 is attached to the chassis 22 of the APC 24 and is provided between motive elements (e.g., tracks 58 in FIG. 2). In some embodiments, attachment of the battery block 10 to the chassis 22 may allow for various housings to be provided with the chassis 22 without requiring removal and/or disconnection of the battery block 10. The battery block 10 attached to the chassis 22 forms an integrated device as discussed in detail below. The housing 25 of the APC 24 may house various components of the APC 24 such as a filter, a pump, and/or various other components as desired. Optionally, a cover may be attached to the housing 25 to provide access to components within the housing 25.

As best illustrated in FIGS. 3A-B, the chassis 22 of the APC 24 defines an interior cavity or region 42 (see FIGS. 3A-D) that may house a motor block 46 comprising at least motor 50 and impeller 54. The housing 25 may be attached to the chassis 22 using various mechanisms or devices as desired. In certain embodiments, attachment of the housing 25 to the chassis 22 may cover the interior cavity 42. Optionally, a portion of the motor block 46 and/or other component housed in the interior cavity 42 may at least partially extend into the housing 25. The APC 24 also includes a rotatable brush 66 as well as tracks 62 that may be utilized to facilitate movement of the APC 24 along a surface. However, the particular APC 24 illustrated should not be considered limiting, and in other embodiments, the APC 24 may be other types of APCs and/or include additional or alternative features as desired. As some non-limiting examples, the battery block 10 may be attachable to an APC with a cover that selectively provides access to the interior region 42, other motive elements (e.g., wheels), pumps, sensors, filters or filter baskets, communication modules (e.g., antennas), combinations thereof, and/or other features or combinations of features as desired.

The attachment of the battery block 10 to the chassis 22 may be direct or indirect as desired. In certain embodiments and beneficially, some or all of battery block 10 remains external to chassis 22, rendering the battery block 10 easily removable from, and re-attachable to, APC 24 as desired. As an example, and as illustrated in FIG. 2, a portion of the housing 15 may form an outer surface 16 of the APC 24. The battery block 10 may be attached to the chassis 22 using various suitable mechanisms or devices as desired, including but not limited to snap-fit connections, clips, clasps, male and female connections, threaded fasteners, pins, combinations thereof, and/or other devices or mechanisms as desired. Non-limiting examples of such attachment is discussed in detail below with reference to FIGS. 3A-D. The number, type, and location of the connecting mechanisms should not be considered limiting.

FIGS. 3A-D depict the ease with which the battery block 10 may be connected to (or disconnected from) the APC 24. In various embodiments, the connection between the battery block 10 and the APC 24 may be "selective" or "removable," meaning that the battery block 10 may be connected to or disconnected from the APC 24 as desired.

Illustrated in FIG. 3A are portions of chassis 22, with any cover (e.g., the housing 25) having been removed so as to show the interior region 42 of the chassis 22. As previously mentioned, in certain embodiments, the motor block 46 with at least the motor 50 and the impeller 54 may be included within interior region 42. In some embodiments, and as illustrated in FIG. 3A, the motor block 46 optionally may include a connector 70 that is configured to selectively engage (e.g., mate with) a complementary connector 74 of the battery block 10 (see, e.g., FIG. 3C). In some embodiments, the mating of the connectors 70, 74 may allow for electrical power from the battery block 10 to be conveyed to motor block 46 to operate motor 50 without material ingress of water into either of the battery block 10 or motor block 46. In the embodiment illustrated and as best shown in FIG. 3A, the connector 74 optionally may be the terminus of a cord 78 extending from the battery block 10 through a sealing grommet 82. Interconnection of the battery block 10 and the motor block 46 need not be as shown, however; instead, as a non-limiting example, the cord 78 could be omitted, and the connectors 70, 74 may be configured to connect directly. Other mechanisms or devices may be used to selectively connect the battery block 10 with the APC 24. In some optional embodiments, the battery block 10 advantageously may be connected to chassis 22 at the nominal rear end 17 of APC 24 (i.e. the end of chassis 22 opposite brush 66). However, in other embodiments, the battery block 10 may be connected to the chassis 22 at other portions of the chassis 22 as desired.

Optionally, and as best illustrated in FIGS. 3B-C, the chassis 22 may include a recess 19 into which battery block 10 is fitted. As mentioned, attachment of battery block 10 to chassis 22 may occur in any suitable manner. In the embodiment illustrated and as best shown in FIGS. 3C-D, the battery block 10 is connected to the chassis 22 via a frictional "snap fit" via engagement of hooks 21 on the battery block 10 (see FIG. 1) with recesses or apertures 23 on the chassis 22 (see FIG. 3C). The hooks 21 are omitted in FIGS. 3A-D for clarity of the figure. In the embodiment, the connection is further secured by screw 86 or other fastener penetrating both the battery block 10 and a bottom 91 of the chassis 22.

If the optional cord 78 is present, it optionally may be passed through a rear opening 94 (see FIG. 3B) of the chassis 22 if needed to allow connector 74 to engage connector 70. If cord 78 is not present, the battery block 10 may be connected to, and disconnected from, the chassis 22 without any need to access the interior region 42 of the chassis 22. In either circumstance, the battery block 10 is easily attached as part of the APC 24 and accessible, in whole or in part, externally of the chassis 22.

Figure 4:
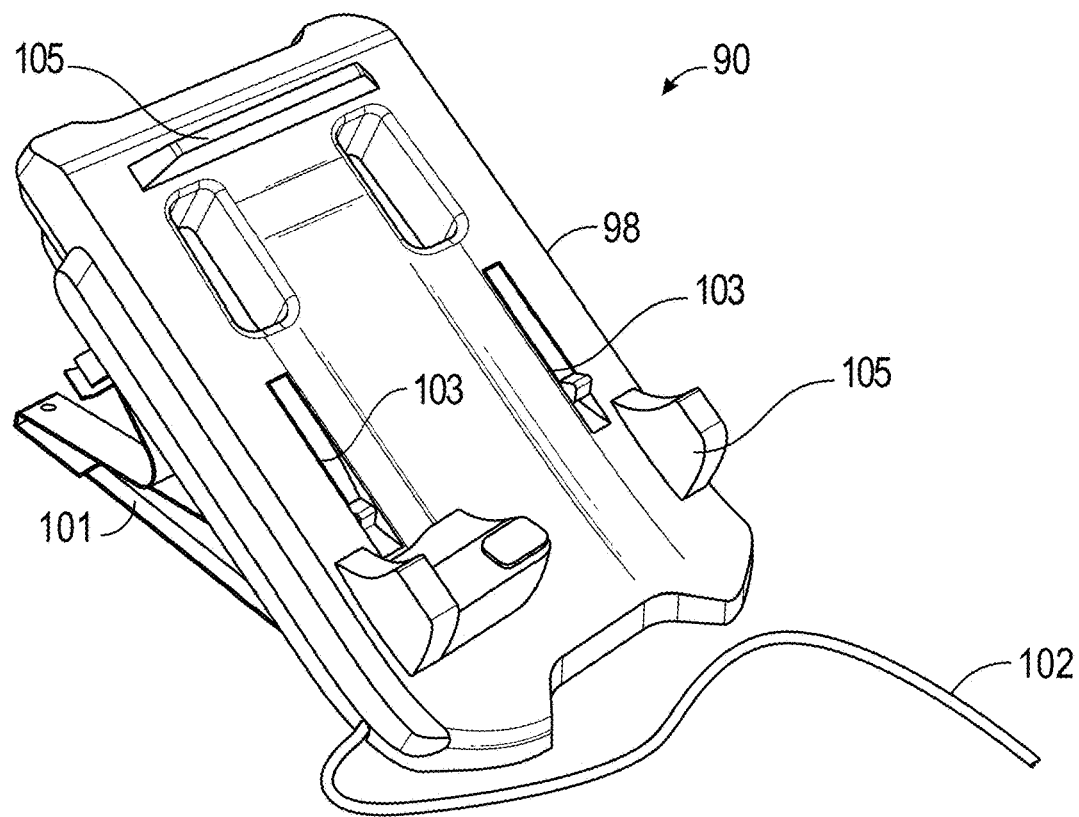
FIG. 4 illustrates a charging system for the APC of FIG. 2 according to embodiments.
Figure 5:
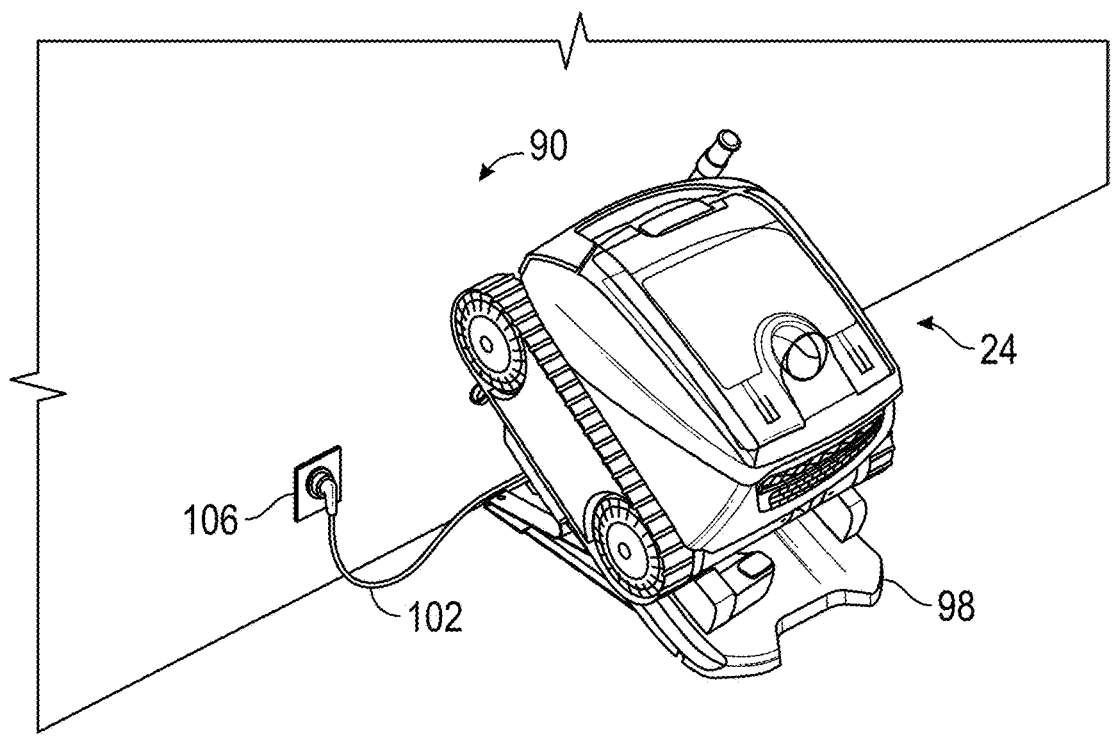
FIG. 5 illustrates the APC of FIG. 2 with the charging system of FIG. 4 according to embodiments.
Figure 6:
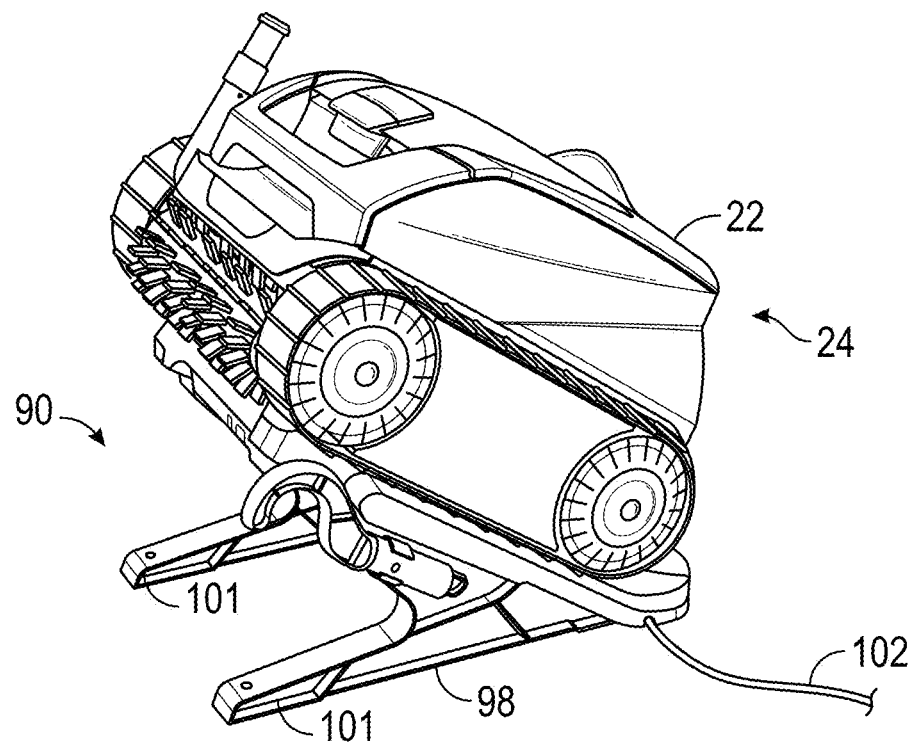
FIG. 6 is another view of the APC with the charging system of FIG. 4.
Figure 7:
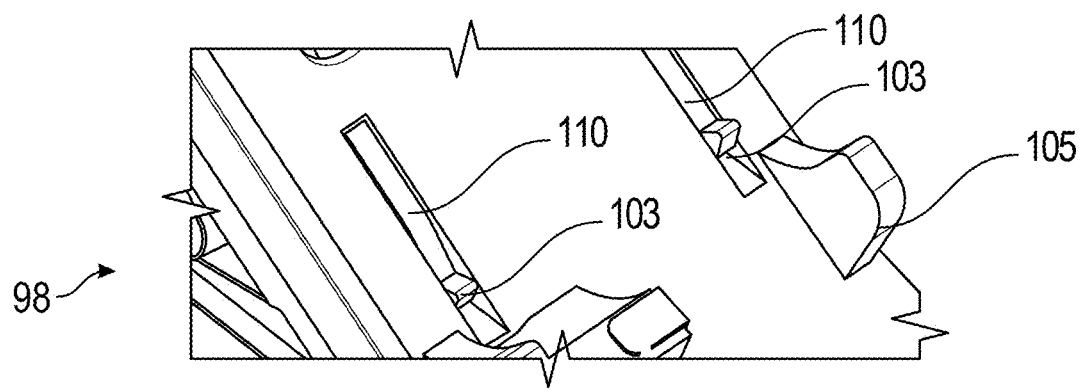
FIG. 7 illustrates a portion of the charging system of FIG. 4.

FIGS. 4-7 conceptually illustrate a non-limiting example of a charging system 90 for selectively charging (or recharging) batteries 14 of the APC 24. In this example, the charging system 90 includes a base or dock 98 which may be connected to a source 106 of electrical power via a cord 102 or other suitable mechanism or device. If available, the dock 98 may be located in any suitable area relative to the swimming pool. The dock 98 further may, but need not, include feet 101 such that the dock 98 may be freestanding as shown in FIGS. 4-6. Optionally, and as depicted in FIGS. 4 and 7, the dock 98 may include electrically conductive portions 103. In the embodiment illustrated, the electrically conductive portion 103 are springs 110, and when APC 24 is positioned correctly on the dock 98, the springs 110 contact the conductive pads 114 of the battery block 10. In this embodiment, such contact between the springs 110 and the conductive pads 114 allows electricity to flow from dock 98 to the batteries 14 within the battery block 10.

In addition to the conductive portions 104, the dock 98 may include one or more supports 105 for selectively supporting the APC 24 on the dock 98. In certain embodiments, the supports 105 may facilitate positioning of the APC 24 on the dock 98.

As best illustrated in FIGS. 5 and 6, during charging or recharging of the batteries 14, the battery block 10 may remain attached to chassis 22, and the entirety of APC 24 is driven or otherwise positioned onto a base or dock 98 of the charging system 90, which in turn is connected (e.g., via the cord 102) to the source 106 of electrical power. Electricity from source 106 may be carried through the cord 102 to the batteries 14 of the battery block 10 for charging.

Figure 8:
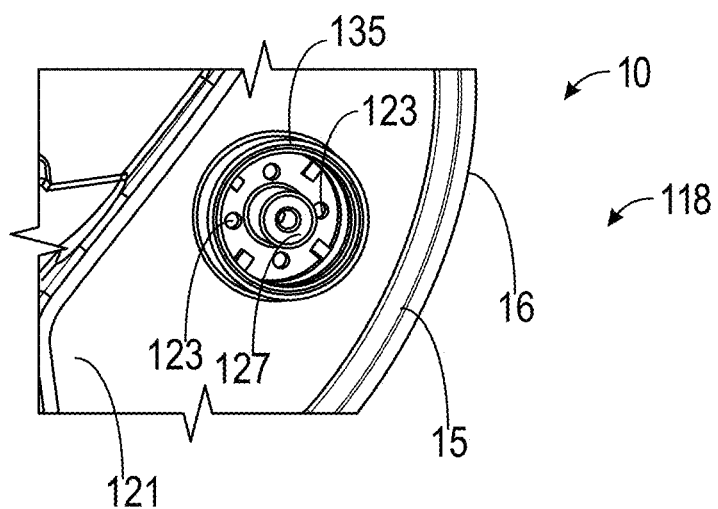
FIG. 8 illustrates a portion of the battery block of FIG. 1 with a venting system according to embodiments.
Figure 9:
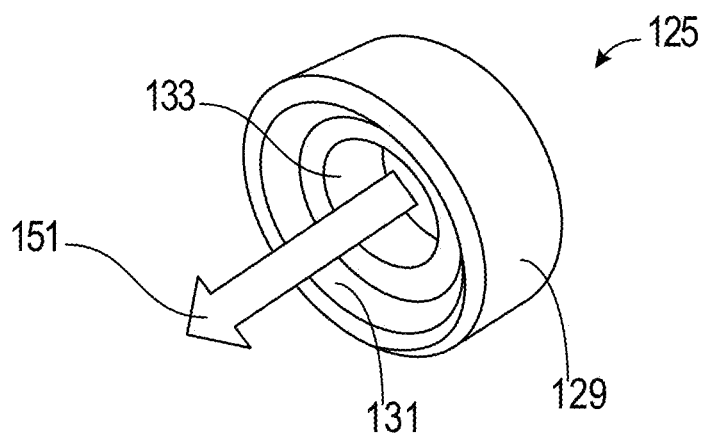
FIG. 9 illustrates a sealing device of the venting system of FIG. 8.

In some embodiments of the battery block 10, the batteries 14 optionally can be of the lithium-ion type. In these versions, gases produced by batteries 14 may require, or at least benefit from, being vented from battery block 10. FIGS. 8 and 9 show an exemplary venting system 118 for selectively venting these gases (and/or otherwise included as desired) while allowing the battery block 10 otherwise to remain sealed. In such embodiments, a portion of the battery block 10 (e.g., a side 121 of the housing 15 as illustrated in FIG. 8) may include one or more venting apertures 123. Optionally, and depending on the type of sealing device of the venting system 118, the side 121 includes a seal support 127 and a side wall 135.

The venting system 118 may be various devices or mechanisms for selectively venting the battery block 10. In the embodiment illustrated, the venting system 118 includes a sealing device 125 and spring structure (not illustrated) biasing the sealing device 125 to cover and/or otherwise seal the venting apertures 123. In the embodiment illustrated, and as best illustrated in FIG. 9, the sealing device 125 is a lip seal 129 with a spring-receiving cavity 131 and a central aperture 133. When assembled, the lip seal 129 is positioned on the seal support 127 and within the side wall 135 such that the seal support 127 is received within the central aperture 133. The spring device may be positioned within the spring-receiving cavity 131 and bias the lip seal 129 into contact with the seal support 127, thereby sealing the venting apertures 123. As overpressure builds within battery block 10, it overcomes the biasing force of the spring device and displaces the lip seal (e.g., a gap is formed between the seal support 127 and the sealing device 125), thus allowing gas to escape from battery block 10 and through the sealing device 125 (represented by arrow 151 in FIG. 9). As the overpressure diminishes, the spring structure returns to its normal position, no longer displacing the lip seal.

Figure 10:
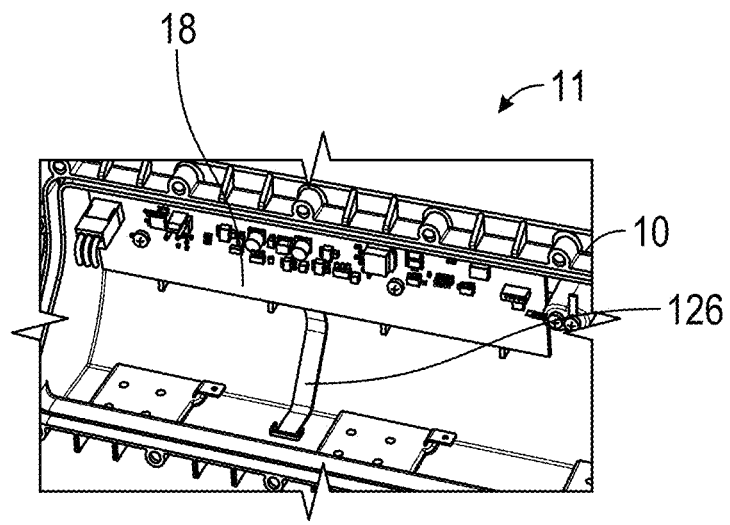
FIG. 10 illustrates the battery block of FIG. 1 with a sensor.
Figure 11:
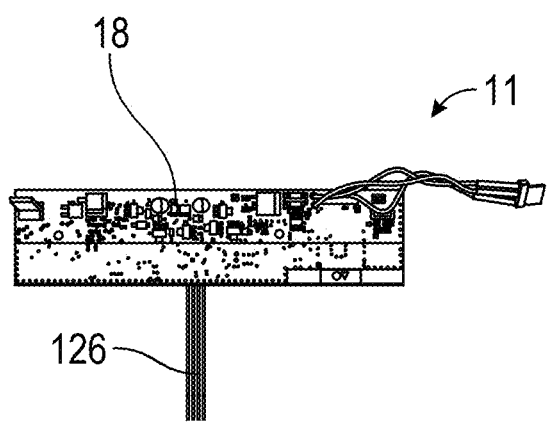
FIG. 11 illustrates the sensor of FIG. 10 and a controller of the battery block of FIG. 1.
Figure 12:
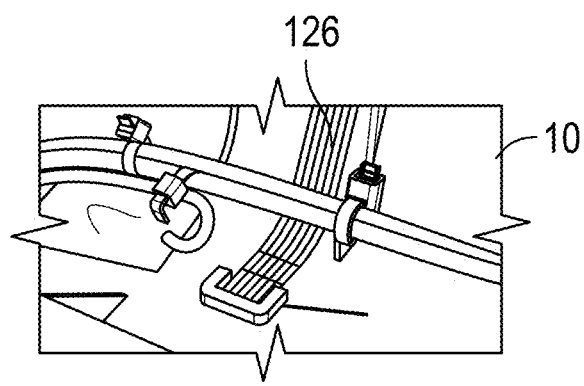
FIG. 12 is another view of the battery block of FIG. 1 with the sensor of FIG. 10.

Referring to FIGS. 10-12, in some embodiments, the battery block 10 optionally includes one or more sensors 126 for detecting various characteristics or features about the battery block 10 and/or the APC 24. In certain aspects, the one or more sensors 126 may be communicatively coupled to the controller 18, and the controller 18 may control an operation of the battery block 10 and/or the APC 24 based on information detected by the one or more sensors 126. As one non-limiting example, the one or more sensors 126 is a humidity sensor for detecting whether water has intruded into the battery block 10, and the controller 18 may cease charging of the batteries 14 should water be detected by the sensor 126. As another non-limiting example, the one or more sensors 126 is a temperature sensor so as to monitor potential heat build-ups within the battery block 10 and/or the one or more sensors 126 is an exterior water sensor so as to prevent operation of APC 24 when no water is present (e.g. when APC 24 is remote from the swimming pool). In FIGS. 10-12, a single sensor 126 is illustrated, and the sensor 126 is a humidity sensor 141. The number, type, or location of sensors should not be considered limiting on the disclosure.

Exemplary concepts and combinations of features of the invention may include:

A. A modular battery block configured for attachment to a component of an automatic swimming pool cleaner.

B. The modular battery block according to statement A., wherein the modular battery block is configured to form an external surface when assembled with the automatic swimming pool cleaner.

C. The modular battery block according to statement A. or B., further comprising a housing and at least one source of electrical power within the housing.

D. The modular battery block according to any one of statements A.-C., further comprising at least one snap fit connector for selectively connecting the modular battery block with the automatic swimming pool cleaner.

E. An automatic swimming pool cleaner (i) comprising a chassis and (ii) powered by at least one battery attached to the chassis and accessible from externally of the chassis.

F. The automatic swimming pool cleaner according to statement E., wherein the chassis defines an interior cavity and a recess external to the interior cavity, and wherein the battery is attached to at least the recess.

G. The automatic swimming pool cleaner according to statement E. or F., further comprising a battery block housing the at least one battery, wherein the battery block is attached to the recess.

H. The automatic swimming pool cleaner according to any one of statements E.-G., further comprising a battery block housing the at least one battery, wherein the battery block is at least partially external to the chassis and defines an external surface of the automatic swimming pool cleaner.

I. The automatic swimming pool cleaner according to any one of statements E.-H., wherein the chassis defines an interior cavity, and wherein the battery block is external from the interior cavity.

J. The automatic swimming pool cleaner according to any one of statements E.-I., wherein the battery block further comprises a controller and at least one sensor communicatively coupled to the controller, and wherein the controller is configured to control the battery block based on information detected by the at least one sensor.

K. The automatic swimming pool cleaner according to any one of statements E.-J., wherein the battery block is indirectly connected to the chassis.

L. The automatic swimming pool cleaner according to any one of statements E.-K., further comprising a venting system for selectively venting the battery block.

M. An automatic swimming pool cleaner comprising (i) at least one battery and (ii) an arrangement for venting gas produced by the at least one battery.

N. The automatic swimming pool cleaner according to statement M., further comprising a battery module housing the at least one battery, wherein the battery module comprises at least one venting aperture, and wherein the venting system is configured to control a flow of the gas through the venting aperture.

O. The automatic swimming pool cleaner according to statement M. or N., wherein the venting system comprising a sealing device and a spring device biasing the sealing device.

P. The automatic swimming pool cleaner according to any one of statements M.-O., wherein the sealing device comprises a lip seal.

Q. The automatic swimming pool cleaner according to any one of statements M.-P., further comprising a chassis defining an interior cavity, wherein the at least one battery is accessible from externally of the chassis.

R. A method of supplying electrical power to an automatic swimming pool cleaner having a chassis and a motor, comprising: (i) attaching a modular battery block to the chassis so as to form an integrated device, and (ii) causing an electrical connection within the integrated device between the motor and at least one battery of the modular battery block.

S. The method according to statement R., wherein attaching the modular battery block comprises connecting the modular battery block at least partially externally to an interior cavity defined by the chassis.

T. The method according to statement R. or S., wherein attaching the modular battery block comprises connecting the modular battery block such that the modular battery block forms an external surface of the integrated device.

U. The method according to any one of statements R.-T., further comprising receiving information from at least one sensor on the battery block, and controlling the supply of electrical power based on the information received from the at least one sensor.

V. An automatic swimming pool cleaner comprising: a chassis defining an interior cavity; and a modular battery block connected to the chassis and at least partially external to the interior cavity, the modular battery block comprising at least one source of electrical power.

W. The automatic swimming pool cleaner according to statement V., further comprising a venting system configured to selectively vent the modular battery block.

X. The automatic swimming pool cleaner according to statement V. or W., wherein the modular battery block further comprises at least one electrically conductive pad for selectively engaging a charging system.

These examples are not intended to be mutually exclusive, exhaustive, or restrictive in any way, and the invention is not limited to these example embodiments but rather encompasses all possible modifications and variations within the scope of any claims ultimately drafted and issued in connection with the invention (and their equivalents). For avoidance of doubt, any combination of features not physically impossible or expressly identified as non-combinable herein may be within the scope of the invention.

The foregoing is provided for purposes of illustrating, explaining, and describing embodiments of the present invention. Modifications and adaptations to these embodiments will be apparent to those skilled in the art and may be made without departing from the scope or spirit of the invention. Additionally, the word "pool" and phrase "swimming pool" as used herein may include vessels such as spas and hot tubs within their definitions. Finally, the entire contents of all of the Lancry, Garti, and Renaud applications are incorporated herein by this reference.

What is claimed is:

1. An automatic swimming pool cleaner comprising:
   a chassis defining an interior cavity configured to house a motor of the automatic swimming pool cleaner; and
   a battery block with at least one battery, wherein the battery block is attachable to the chassis and removable from the chassis, wherein the battery block is at least partially external to the chassis and at least partially defines an external surface of the automatic swimming pool cleaner, wherein the battery block further comprises:
      one or more charging pads configured to engage charging elements of a charging system for charging or re-charging the at least one battery, wherein the one or more charging pads are provided on a portion of the battery block at least partially defining the external surface of the automatic swimming pool cleaner such that the one or more charging pads are exposed on the external surface of the automatic swimming pool cleaner when the battery block is attached to the chassis and are removed from the chassis when the battery block is removed from the chassis.

2. The automatic swimming pool cleaner of claim 1, wherein the chassis defines a recess external to the interior cavity, and wherein the battery block is attached to at least the recess.

3. The automatic swimming pool cleaner of claim 1, wherein the battery block further comprises a controller and at least one sensor communicatively coupled to the controller, wherein the controller is configured to control the battery block based on information detected by the at least one sensor.

4. The automatic swimming pool cleaner of claim 1, further comprising motive elements on opposing sides of the chassis and such that the chassis is between the motive elements, wherein the battery block is attached to an end of the chassis and between the motive elements.

5. The automatic swimming pool cleaner of claim 1, wherein the battery block further comprises a venting system, wherein the venting system comprises a venting aperture on a side of the battery block between a first wall and a second wall of the battery block, wherein the first wall of the battery block at least partially defines the external surface of the automatic swimming pool cleaner.

6. The automatic swimming pool cleaner of claim 1, wherein the battery block further comprises one or more visual indicators on a portion of the battery block that at least partially defines the external surface of the automatic swimming pool cleaner, wherein the one or more visual indicators are configured to provide an indication of a characteristic of the battery block or a characteristic of the automatic swimming pool cleaner.

7. The automatic swimming pool cleaner of claim 6, wherein the one or more visual indicators comprise an adjustable characteristic.

8. The automatic swimming pool cleaner of claim 6, wherein the one or more visual indicators comprise one or more of a power indicator, a charging indicator, a communication indicator, or an operational mode indicator.

9. The automatic swimming pool cleaner of claim 1, wherein the battery block further comprises a powering button or switch on a portion of the battery block that at least partially defines the external surface of the automatic swimming pool cleaner.

10. An automatic swimming pool cleaner comprising:
    a chassis comprising a first side, a second side, a bottom side extending between the first side and the second side, the bottom side defining a portion of an external surface of the pool cleaner, a front end extending between the first side and the second side, and a rear end opposite the front end and extending between the first side and the second side;
    a motor housed within an interior cavity of the chassis;
    a battery block with at least one battery, wherein the battery block is at least partially external to the chassis and at least partially defines the external surface of the automatic swimming pool cleaner, and wherein the battery block is attachable to and detachable from the chassis; and
    a first motive element supported on the first side of the chassis and a second motive element supported on the second side of the chassis and such that the chassis is between the first and second motive elements, wherein the battery block is attached to the front end or the rear end of the chassis and between the motive elements such that the motive elements overlap opposing sides of the battery block.

11. The automatic swimming pool cleaner of claim 10, further comprising a brush connected to the chassis at the other of the rear end or the front end opposite the at least one battery block.

12. An automatic swimming pool cleaner comprising:
    a chassis comprising a bottom side and a plurality of side walls extending upwards from the bottom side, the bottom side and the plurality of side walls defining an interior cavity configured to house a pump and a filter of the automatic pool cleaner, wherein a first side wall of the plurality of side walls defines a recess external to the interior cavity;

a battery block with at least one battery, wherein the battery block is attachable to the recess of the chassis and removable from the recess of the chassis, wherein the battery block is at least partially external to the chassis and at least partially defines an external surface of the automatic swimming pool cleaner; and an engagement system comprising hooks on a wall of the battery block and apertures on the first side wall and within the recess, wherein the hooks are configured to engage the apertures to secure the battery block on the chassis.

\* \* \* \* \*